US006586384B2

(12) United States Patent
Hemmington et al.

(10) Patent No.: US 6,586,384 B2
(45) **Date of Patent: *Jul. 1, 2003**

(54) METHOD OF TREATING FABRICS AND APPARATUS USED THEREIN

(75) Inventors: Sandra Hemmington, Sharnbrook (GB); Steven Howell, Sharnbrook (GB); Julie Little, Sharnbrook (GB); Cornelis Paul Van Der Logt, Vlaardingen (NL); Neil James Parry, Colworth House (GB); Richard George Smith, Bebington Wirral (GB)

(73) Assignee: Unilever Home & Personal Care USA division of Conopco, Inc., Greenwich, CT (US)

( * ) Notice: Subject to any disclaimer, the term of this patent is extended or adjusted under 35 U.S.C. 154(b) by 6 days.

This patent is subject to a terminal disclaimer.

(21) Appl. No.: 09/742,694

(22) Filed: Dec. 20, 2000

(65) Prior Publication Data

US 2001/0034314 A1 Oct. 25, 2001

(30) Foreign Application Priority Data

Dec. 22, 1999 (EP) ........................................... 99310427

(51) Int. Cl.[7] ............................ C12S 9/00; C11D 7/18; C11D 7/54

(52) U.S. Cl. ....................... 510/392; 510/372; 510/374; 510/375; 510/380; 510/379; 510/393; 510/394; 510/283; 510/286; 510/299; 510/300; 510/302; 510/303; 510/305; 510/308

(58) Field of Search ................................ 510/372, 374, 510/375, 380, 379, 392, 393, 394, 283, 286, 299, 300, 302, 303, 305, 308

(56) References Cited

U.S. PATENT DOCUMENTS

| | | | | |
|---|---|---|---|---|
| 5,190,661 A | | 3/1993 | Bruening et al. | 210/670 |
| 5,500,153 A | | 3/1996 | Figueroa et al. | 252/548 |
| 5,652,206 A | | 7/1997 | Bacon et al. | 510/101 |
| 5,686,014 A | | 11/1997 | Baillely et al. | 252/186.33 |
| 5,912,157 A | * | 6/1999 | von der Osten et al. | 435/209 |
| 5,935,271 A | * | 8/1999 | Lappas et al. | 8/137 |
| 6,218,350 B1 | * | 4/2001 | Beggs et al. | 510/305 |

FOREIGN PATENT DOCUMENTS

DE 195 36 714 4/1997

(List continued on next page.)

OTHER PUBLICATIONS

PCT International Search Report in a PCT application PCT/EP 00/12530 Aug. 12, 2000.

PCT International Search Report in a PCT application PCT/EP 00/12531 Aug. 12, 2000.

PCT International Search Report in a PCT application PCT/EP 00/12523 Aug. 12, 2000.

Derwent Abstract of JP 10 174583—Jun. 30, 1998.

(List continued on next page.)

*Primary Examiner*—Yogendra N. Gupta
*Assistant Examiner*—Preeti Kumar
(74) *Attorney, Agent, or Firm*—Rimma Mitelman

(57) ABSTRACT

A method of delivering a benefit agent to a selected area of a fabric for exerting a predetermined activity, wherein the area is pre-treated with a multi-specific binding molecule which has a high binding affinity to said area through one specificity and is capable of binding to said benefit agent through another specificity, followed by contacting said pre-treated area with said benefit agent, to enhance said pre-determined activity to said area. Preferably, the binding molecule is an antibody or fragment thereof, or a fusion protein comprising a cellulose binding domain and a domain having a high binding affinity to another ligand which is directed to said benefit agent. The method is useful for stain removal, perfume delivery, and treating collars and cuffs for wear.

25 Claims, 1 Drawing Sheet

FOREIGN PATENT DOCUMENTS

| | | | |
|---|---|---|---|
| DE | 196 21 224 | | 11/1997 |
| EP | 0 385 529 | | 9/1990 |
| WO | 94/25591 | | 11/1994 |
| WO | 95/02675 | | 1/1995 |
| WO | 95/09909 | | 4/1995 |
| WO | 98/00500 | | 1/1998 |
| WO | 98/01523 | | 1/1998 |
| WO | 98/06812 | | 2/1998 |
| WO | 98/07820 | | 2/1998 |
| WO | WO 98/23716 | * | 6/1998 |
| WO | 98/23716 | | 6/1998 |
| WO | 98/56885 | | 12/1998 |
| WO | 99/02693 | | 1/1999 |
| WO | 99/12624 | | 3/1999 |
| WO | 99/23221 | | 5/1999 |
| WO | 99/36469 | | 7/1999 |
| WO | 99/57154 | | 11/1999 |
| WO | WO 99/57154 | * | 11/1999 |
| WO | 99/57155 | | 11/1999 |
| WO | 99/57250 | | 11/1999 |
| WO | 00/18864 | | 4/2000 |
| WO | 00/36094 | | 6/2000 |
| WO | 01/07555 | | 2/2001 |
| WO | 01/16269 | | 3/2001 |

OTHER PUBLICATIONS

PCT International Search Report in a PCT application PCT/EP 00/12532 Aug. 12, 2000.

Co–pending application: Davis et al.; Ser. No. 09/742,690; Filed—Dec. 20, 2000.

Co–pending application: Howell et al.; Ser. No. 09/742,693; Filed—Dec. 20, 2000.

Co–pending application: Howell et al.; Ser. No. 09/472,689; Filed—Dec. 20, 2000.

Co–pending application; Antheunisse et al.; Ser. No. 09/742, 692; Filed—Dec. 20, 2000.

Co–pending application; Berry et al.; Ser. No. 09/712,561; Filed—Nov. 14, 2000.

Derwent Abstract of DE 196 21 224. Nov. 27, 1997.

PCT International Search Report in a PCT application PCT/EP 00/12529 Aug. 12, 2000.

PCT International Search Report in a PCT application PCT/EP 00/12531 Aug. 12, 2000.

* cited by examiner

METHOD OF TREATING FABRICS AND APPARATUS USED THEREIN

TECHNICAL FIELD

The present invention generally relates to the use of multi-specific molecules and in particular multi-specific antibodies for treating fabrics, especially garment, with a benefit agent, and apparatus used therein. More in particular, the invention relates to a method of delivering a benefit agent to a selected area of the fabric for exerting a predetermined activity. In a preferred embodiment, the invention relates to a method of stain bleaching on fabrics which comprises using multi-specific molecules to pretreat the stained area of the fabric.

BACKGROUND AND PRIOR ART

Multi-functional, in particular multi-specific agents including bi-specific agents are well known in the art. Gluteraldehyde, for example, is widely used as a coupling or crosslinking agent. The development of bi- and multi-functional antibodies has opened a wide scale of new opportunities in various technological fields, in particular in diagnostics but also in the detergent area.

WO 98/56885 (Unilever) discloses a bleaching enzyme which is capable of generating a bleaching chemical and having a high binding affinity for stains present on fabrics, as well as an enzymatic bleaching composition comprising said bleaching enzyme, and a process for bleaching stains on fabrics. The binding affinity may be formed by a part of the polypeptide chain of the bleaching enzyme, or the enzyme may comprise an enzyme part which is capable of generating a bleach chemical that is coupled to a reagent having the high binding affinity for stains present on fabrics. In the latter case the reagent may be bispecific, comprising one specificity for stain and one for enzyme. Examples of such bispecific reagents mentioned in the disclosure are antibodies, especially those derived from Camelidae having only a variable region of the heavy chain polypeptide ($V_{HH}$), peptides, peptidomimics, and other organic molecules. The enzyme which is covalently bound to one functional site of the antibody usually is an oxidase, such as glucose oxidase, galactose oxidase and alcohol oxidase, which is capable of forming hydrogen peroxide or another bleaching agent. Thus, if the multi-specific reagent is an antibody, the enzyme forms an enzyme/antibody conjugate which constitutes one ingredient of a detergent composition. During washing, said enzyme/antibody conjugate of the detergent composition is targeted to stains on the clothes by another functional site of the antibody, while the conjugated enzyme catalyzes the formation of a bleaching agent in the proximity of the stain and the stain will be subjected to bleaching.

WO-A-98/00500 (Unilever) discloses detergent compositions wherein a benefit agent is delivered onto fabric by means of peptide or protein deposition aid having a high affinity for fabric. The benefit agent can be a fabric softening agent, perfume, polymeric lubricant, photosensitive agent, latex, resin, dye fixative agent, encapsulated material, antioxidant, insecticide, soil repelling agent, anti-microbial agent, or a soil release agent. The benefit agent is attached or adsorbed to a peptide or protein deposition aid having a high affinity to fabric. Preferably, the deposition aid is a fusion protein containing the cellulose binding domain of a cellulase enzyme. The compositions are said to effectively deposit the benefit agent onto the fabric during the wash cycle.

According to DE-A-196 21 224 (Henkel), the transfer of textile dyes from one garment to another during a washing or rinsing process may be inhibited by adding antibodies against the textile dye to the wash or rinse liquid.

WO-A-98/07820 (P&G) discloses amongst others rinse treatment compositions containing antibodies directed at cellulase and standard softener actives (such as DEQA).

It has now surprisingly been found that a two-step process in which multispecific molecules are bound to pretreat a selected area on a fabric, followed by a step in which a benefit agent is bound to said multispecific molecules will result in a more efficient targeting of the benefit agent to the selected area of the fabric and, accordingly, to a process in which the benefit agent can exert its aimed activity more efficiently.

Based on this principle, the invention can be practised in various embodiments, which will be explained below.

SUMMARY OF THE INVENTION

According to one aspect of the present invention, there is provided a method of delivering a benefit agent to a selected area of a fabric for exerting a pre-determined activity, which comprises pre-treating said area with a multi-specific binding molecule, said binding molecule having a high binding affinity to said area through one specificity and is capable of binding to said benefit agent through another specificity, followed by contacting said pre-treated area with said benefit agent to exert said predetermined activity to said area.

In another aspect of the present invention a device is provided for use in the method described above for depositing a multi-specific binding molecule to a selected area on a fabric, said binding molecule having a high binding affinity to said area through one specificity and is capable of binding to said benefit agent through another specificity to said agent.

These and other aspects and embodiments will be described in more detail in the description which follows.

DETAILED DESCRIPTION OF THE INVENTION

Figure 1:
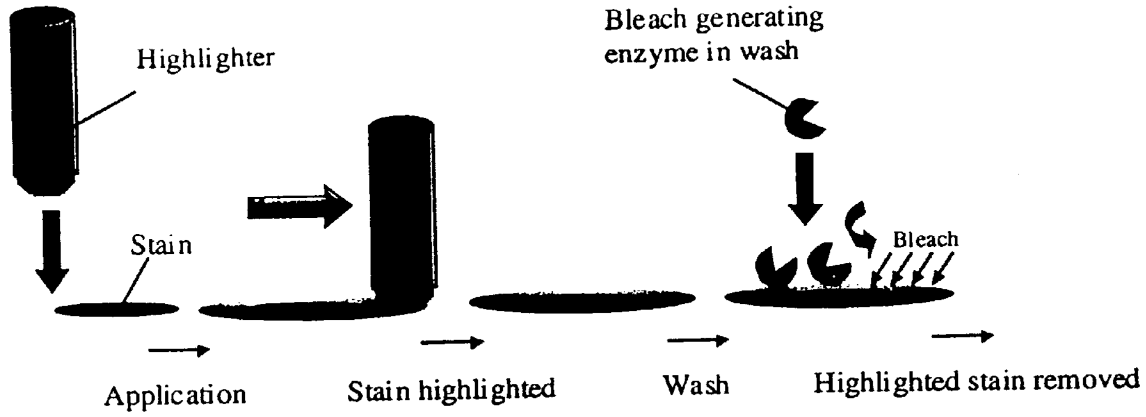
FIG. 1 shows a typical treatment of stains according to the present invention by selectively "highlighting" stains with a roll-on pen comprising a composition of a multi-specific binding molecule having a high binding affinity through one specificity to the area of the stain and through another specificity to a bleaching enzyme which is capable of generating a bleaching compound in the wash in the proximity of the stains to be bleached.

The invention provides in one aspect the deposition of a multi-specific binding molecule to a selected area of a fabric to which it has a high binding affinity through one specificity, in order to enable a benefit agent which is capable of binding to said binding molecule through another specificity to exert a pre-determined activity in close proximity of the targeted area on the fabric.

In a first, pre-treating step the binding molecule is directly deposited on the fabric, for example a garment, preferably at relatively high concentration, thus enabling the binding molecule to bind to the fabric in an efficient way. In a second step, the binding molecule is contacted with the benefit agent, which is usually contained in a dispersion or solution, preferably an aqueous solution, thus enabling the benefit agent to bind to the binding molecule through another specificity of said binding molecule.

As used herein, the term "multi-specific binding molecule" means a molecule which at least can associate onto fabric and also capture benefit agent. Similarly, the term "bi-specific binding molecule" as used herein indicates a molecule which can associate onto fabric and capture benefit agent.

The multi-specific binding molecule can be any suitable molecule with at least two functionalities, i.e. having a high binding affinity to the fabric to be treated and being able to bind to a benefit agent, thereby not interfering with the predetermined activity of the benefit agent and possible other activities aimed. In a preferred embodiment, said binding molecule is an antibody, or an antibody fragment, or a derivative thereof. If the antibody (or other binding molecule) has very low affinity to the benefit agent and is deposited in large amounts, this may result in non-specific capture of benefit agent, and consequently, benefit agent may be non-specifically deposited onto the fabric resulting in inefficient use of the benefit agent, as is illustrated in Example 2.

The present invention can be advantageously used in, for example, treating stains on fabrics, preferably by bleaching said stains. In a first step, the binding molecule is applied, preferably on the stain. The benefit agent which is then bound to the binding molecule preferably is an enzyme or enzyme part, more preferably an enzyme or enzyme capable of catalyzing the formation of a bleaching agent under conditions of use. The enzyme or enzyme part is usually contacted to the binding molecule (and the stains) by soaking the pre-treated fabric into a dispersion or solution comprising the enzyme or enzyme part. The dispersion or solution which usually but not necessarily is an aqueous dispersion or solution also comprises ingredients generating the bleaching agent, or such ingredients are added later. Preferably, the enzyme or enzyme part and said other ingredients generating a bleach are contained in a washing composition, and the step of binding the enzyme (or part thereof) to the binding molecule and generating the bleaching agent is performed during the wash.

Alternatively, the benefit agent of choice may be added prior to or after washing, for example in the rinse or prior to ironing, depending on its use.

The targeting of the benefit agent according to the invention which in this typical example is a bleaching enzyme, results in a higher concentration of bleaching agent in the proximity of the stains to be treated, before, during or after the wash. Alternatively, less bleaching enzyme is needed as compared to known non-targeting or less efficient targeting methods of treating stains.

Another typical and preferred example of the use of the present invention is to direct a fragrance (such as a perfume), to a selected region of a fabric to deliver or capture the fragrance so that it is released over time. A further typical use of the present invention is treating a fabric where the colour is faded by directing a benefit agent to the area in order to colour that region. Similarly, a damaged area of a fabric can be highlighted to direct a repair of cellulose fibers. These agents are for example suitably added to the pre-treated fabric after washing, in the rinse.

Other applications, such as using fabric softening agents, polymeric lubricants, photoprotective agents, latexes, resins, dye fixative agents, encapsulated materials antioxidants, insecticides, soil repelling agents or soil release agents, as well as other agents of choice, and ways and time of adding the agents to the pre-treated fabric are fully within the ordinary skill of a person skilled in the art.

In another embodiment of the invention the benefit agent is preferably applied to said area of a fabric by a dispenser such as a roll-on pen or an impregnated brush, or through a semi-solid wax or soap stick, spray, aerosol, gel (semi liquid), and the like. The deposition can be performed in various ways, for example using a roller, sprayer, stick, brush, aerosol, gel, foam, and the like.

In order to be more fully understood, certain elements of the present invention will be described hereinafter in more detail. Reference is also made to WO-A-98/56885, referred to above, the content of which is incorporated herewith by reference.

1.0 Binding Molecules

In the first step according to the invention a multispecific binding molecule is delivered to a predetermined area of a fabric, said binding molecule having a high affinity to said area through one specificity.

The degree of binding of a compound A to another molecule B can be generally expressed by the chemical equilibrium constant $K_d$ resulting from the following reaction:

$$[A]+[B]\Leftrightarrow[A{\equiv}B]$$

The chemical equilibrium constant $K_d$ is then given by:

$$K_d=\frac{[A]\times[B]}{[A\equiv B]}$$

Whether the binding of a molecule to the fabric is specific or not can be judged from the difference between the binding ($K_d$ value) of the molecule to one type of fabric, versus the binding to another type of fabric material. For applications in laundry, said material will be a fabric such as cotton, polyester, cotton/polyester, or wool. However, it will usually be more convenient to measure $K_d$ values and differences in $K_d$ values on other materials such as a polystyrene microtitre plate or a specialised surface in an analytical biosensor. The difference between the two binding constants should be minimally 10, preferably more than 100, and more preferably, more than 1000. Typically, the molecule should bind to the fabric, or the stained material, with a $K_d$ lower than $10^{-4}$ M, preferably lower than $10^{-6}$ M and could be $10^{-10}$ M or even less. Higher binding affinities ($K_d$ of less than $10^{-5}$ M) and/or a larger difference between the one type of fabric and another type (or background binding) would increase the deposition of the benefit agent. Also, the weight efficiency of the molecule in the total composition would be increased and smaller amounts of the molecule would be required.

Several classes of binding molecules can be envisaged which deliver the capability of specific binding to fabrics, to which one would like to deliver the benefit agent. In the following we will give a number of examples of such molecules having such capabilities, without pretending to be exhaustive. Reference is also made in this connection to WO-A-98/56885 (Unilever), the disclosure of which is incorporated herein by reference.

The concentration of the binding molecules to be used onto the fabric is not very critical but should generally not be too high, because of cost considerations and non-specificity, as described before. Usually, an upper limit of about 1 mg/ml will suffice. The lower limit will predominantly depend upon the affinity to the highlighted area and will usually be in the range of 1 $\mu$g/ml to 1 ng/ml.

1.1 Antibodies

Antibodies are well known examples of compounds which are capable of binding specifically to compounds against which they were raised. Antibodies can be derived from several sources. From mice, monoclonal antibodies can be obtained which possess very high binding affinities. From such antibodies, Fab, Fv or scFv fragments, can be prepared which have retained their binding properties. Such antibodies or fragments can be produced through recombinant DNA technology by microbial fermentation. Well known production hosts for antibodies and their fragments are yeast, molds or bacteria.

A class of antibodies of particular interest is formed by the Heavy Chain antibodies as found in Camelidae, like the camel or the llama. The binding domains of these antibodies consist of a single polypeptide fragment, namely the variable region of the heavy chain polypeptide ($V_{HH}$). In contrast, in the classic antibodies (murine, human, etc.), the binding domain consist of two polypeptide chains (the variable regions of the heavy chain ($V_H$) and the light chain ($V_L$)). Procedures to obtain heavy chain immunoglobulins from Camelidae, or (functionalized) fragments thereof, have been described in WO-A-94/04678 (Casterman and Hamers) and WO-A-94/25591 (Unilever and Free University of Brussels).

Alternatively, binding domains can be obtained from the $V_H$ fragments of classical antibodies by a procedure termed "camelization". Hereby the classical $V_H$ fragment is transformed, by substitution of a number of amino acids, into a $V_{HH}$-like fragment, whereby its binding properties are retained. This procedure has been described by Riechmann et al. in a number of publications (J. Mol. Biol. (1996) 259, 957–969; Protein. Eng. (1996) 9, 531–537, Bio/Technology (1995) 13, 475–479). Also $V_{HH}$ fragments can be produced through recombinant DNA technology in a number of microbial hosts (bacterial, yeast, mould), as described in WO-A-94/29457 (Unilever).

Methods for producing fusion proteins that comprise an enzyme and an antibody or that comprise an enzyme and an antibody fragment are already known in the art. One approach is described by Neuberger and Rabbits (EP-A-Q 194 276). A method for producing a fusion protein comprising an enzyme and an antibody fragment that was derived from an antibody originating in Camelidae is described in WO-A-94/25591. A method for producing bispecific antibody fragments is described by Holliger et al. (1993) PNAS 90, 6444–6448.

WO-A-99/23221 (Unilever) discloses multivalent and multispecific antigen binding proteins as well as methods for their production, comprising a polypeptide having in series two or more single domain binding units which are preferably variable domains of a heavy chain derived from an immunoglobulin naturally devoid of light chains, in particular those derived from a Camelid immunoglobulin.

An alternative approach to using fusion proteins is to use chemical cross-linking of residues in one protein for covalent attachment to the second protein using conventional coupling chemistries, for example as described in Bioconjugate Techniques, G. T. Hermanson, ed. Academic Press, Inc. San Diego, Calif., USA. Amino acid residues incorporating sulphydryl groups, such as cysteine, may be covalently attached using a bispecific reagent such as succinimidyl-maleimidophenylbutyrate (SMPB), for example. Alternatively, lysine groups located at the protein surface may be coupled to activated carboxyl groups on the second protein by conventional carbodiimide coupling using 1-ethyl-3-[3-dimethylaminopropyl] carbodiimide (EDC) and N-hydroxysuccinimide (NHS).

A particularly attractive feature of antibody binding behavior is their reported ability to bind to a "family" of structurally-related molecules. For example, in Gani et al. (J. Steroid Biochem. Molec. Biol. 48, 277–282) an antibody is described that was raised against progesterone but also binds to the structurally-related steroids, pregnanedione, pregnanolone and 6-hydroxy-progesterone. Therefore, using the same approach, antibodies could be isolated that bind to a whole "family" of stain chromophores (such as the polyphenols, porphyrins, or caretenoids as described below). A broad action antibody such as this could be used to treat several different stains when coupled to a bleaching enzyme.

1.2 Fusion Proteins Comprising a Cellulose Binding Domain (CBD)

Another class of suitable and preferred binding molecules for the purpose of the present invention are fusion proteins comprising a cellulose binding domain and a domain having a high binding affinity for another ligand. The cellulose binding domain is part of most cellulase enzymes and can be obtained therefrom. CBDs are also obtainable from xylanase and other hemicellulase degrading enzymes. Preferably, the cellulose binding domain is obtainable from a fungal enzyme origin such as Humicola, Trichoderma, Thermonospora, Phanerochaete, and Aspergillus, or from a bacterial origin such as Bacillus, Clostridium, Streptomyces, Cellulomonas and Pseudomonas. Especially preferred is the cellulose binding domain obtainable from *Trichoderma reesei.*

In the fusion protein, the cellulose binding domain is fused to a second domain having a high binding affinity to another ligand. Preferably, the cellulose binding domain is connected to the domain having a high binding affinity to another ligand by means of a linker consisting of 2–15, preferably 2–5 amino acids.

The second domain having a high binding affinity to another ligand may, for example, be an antibody or an antibody fragment. Especially preferred are heavy chain antibodies such as found in Camelidae.

The CBD antibody fusion binds to the fabric via the CBD region, thereby allowing the antibody domain to bind to corresponding antigens that comprise or form part of the benefit agent.

1.3 Peptides

Peptides usually have lower binding affinities to the substances of interest than antibodies. Nevertheless, the binding properties of carefully selected or designed peptides can be sufficient to provide the desired selectivity to bind a benefit agent or to be used in an aimed process, for example an oxidation process.

A peptide which is capable of binding selectively to a substance which one would like to oxidise, can for instance be obtained from a protein which is known to bind to that specific substance. An example of such a peptide would be a binding region extracted from an antibody raised against that substance. Other examples are proline-rich peptides that are known to bind to the polyphenols in wine.

Alternatively, peptides which bind to such substances can be obtained by the use of peptide combinatorial libraries. Such a library may contain up to $10^{10}$ peptides, from which the peptide with the desired binding properties can be isolated. (R. A. Houghten, Trends in Genetics, Vol 9, no &, 235–239). Several embodiments have been described for this procedure (J. Scott et al., Science (1990) 249, 386–390; Fodor et al., Science (1991) 251, 767–773; K. Lam et al., Nature (1991) 354, 82–84; R. A. Houghten et al., Nature (1991) 354, 84–86).

Suitable peptides can be produced by organic synthesis, using for example the Merrifield procedure (Merrifield (1963) J.Am.Chem.Soc. 85, 2149–2154). Alternatively, the peptides can be produced by recombinant DNA technology in microbial hosts (yeast, moulds, bacteria)(K. N. Faber et al. (1996) Appl. Microbiol. Biotechnol. 45, 72–79).

1.4 Peptidomimics

In order to improve the stability and/or binding properties of a peptide, the molecule can be modified by the incorporation of non-natural amino acids and/or non-natural chemical linkages between the amino acids. Such molecules are called peptidomimics (H. U. Saragovi et al. (1991) Bio/Technology 10, 773–778; S. Chen et al. (1992) Proc.Natl.Acad. Sci. USA 89, 5872–5876). The production of such compounds is restricted to chemical synthesis.

1.5 Other Organic Molecules

The list on proteins and peptides described so far are by no means exhaustive. Other proteins, for example those described in WO-A-00/40968, which is incorporated herein by reference, can also be used.

It can be readily envisaged that other molecular structures, which need not be related to proteins, peptides or derivatives thereof, can be found which bind selectively to substances one would like to oxidise with the desired binding properties. For example, certain polymeric RNA molecules which have been shown to bind small synthetic dye molecules (A. Ellington et al. (1990) Nature 346, 818–822). Such binding compounds can be obtained by the combinatorial approach, as described for peptides (L. B. McGown et al. (1995), Analytical Chemistry, 663A-668A).

This approach can also be applied for purely organic compounds which are not polymeric. Combinatorial procedures for synthesis and selection for the desired binding properties have been described for such compounds (Weber et al. (1995) Angew. Chem. Int. Ed. Engl. 34, 2280–2282; G. Lowe (1995), Chemical Society Reviews 24, 309–317; L. A. Thompson et al. (1996) Chem. Rev. 96, 550–600). Once suitable binding compounds have been identified, they can be produced on a larger scale by means of organic synthesis.

2. The Benefit Agent

In general, the benefit agent can be captured by the binding molecule and retain at least a substantial part of its desired activity. The benefit agent is chosen to impart a benefit onto the garment. This benefit can be in the form of a bleaching agent (produced by, for example, bleaching enzymes) that can de-colourise stains, fragrances, colour enhancers, fabric regenerators, softening agents, finishing agents/protective agents, and the like. These will be described in more detail below.

2.1 Bleaching Enzymes

Suitable bleaching enzymes which are useful for the purpose of the present invention are capable of generating a bleaching chemical.

The bleaching chemical may be hydrogen peroxide which is preferably enzymatically generated. The enzyme for generating the bleaching chemical or enzymatic hydrogen peroxide-generating system is generally selected from the various enzymatic hydrogen peroxide-generating systems which are known in the art. For example, one may use an amine oxidase and an amine, an amino acid oxidase and an amino acid, cholesterol oxidase and cholesterol, uric acid oxidase and uric acid, or a xanthine oxidase with xanthine. Alternatively, a combination of a $C_1$–$C_4$ alkanol oxidase and a $C_1$–$C_4$ alkanol is used, and especially preferred is the combination of methanol oxidase and ethanol. The methanol oxidase is preferably isolated from a catalase-negative Hansenula polymorpha strain. (see for example EP-A-244 920 of Unilever). The preferred oxidases are glucose oxidase, galactose oxidase and alcohol oxidase.

A hydrogen peroxide-generating enzyme could be used in combination with activators which generate peracetic acid. Such activators are well-known in the art. Examples include tetraacetylethylenediamine (TAED) and sodium nonanoyloxybenzenesulphonate (SNOBS). These and other related compounds are described in fuller detail by Grime and Clauss in Chemistry & Industry (Oct. 15, 1990) 647–653. Alternatively, a transition metal catalyst could be used in combination with a hydrogen peroxide generating enzyme to increase the bleaching power. Examples of manganese catalysts are described by Hage et al. (1994) Nature 369, 637–639.

Alternatively, the bleaching chemical is hypohalite and the enzyme is then a haloperoxidase. Preferred haloperoxidases are chloroperoxidases and the corresponding bleaching chemical is hypochlorite. Especially preferred chloroperoxidases are vanadium chloroperoxidases, for example from *Curvularia inaequalis.*

Alternatively, peroxidases or laccases may be used. The bleaching molecule may be derived from an enhancer molecule that has reacted with the enzyme. Examples of laccase/enhancer systems are given in WO-A-95/01426. Examples of peroxidase/enhancer systems are given in WO-A-97/11217.

Suitable examples of bleaches include also photobleaches. Examples of photobleaches are given in EP-A-379 312 (British Petroleum), which discloses a water-insoluble photobleach derived from anionically substituted porphine, and in EP-A-035 470 (Ciba Geigy), which discloses a textile treatment composition comprising a photobleaching component.

2.2 Fragrances

The benefit agent can be a fragrance (perfume), thus through the application of the invention it is able to impart onto the fabric or fragrance that will remain associated with the fabric for a longer period of time than conventional methods. Fragrances can be captured by the binding molecule directly, more preferable is the capture of "packages" or vesicles containing fragrances. The fragrances or perfumes may be encapsulated, e.g. in latex microcapsules.

2.3 Colour Enhancers

The benefit agent can be an agent used to replenish colour on garments. These can be dye molecules or, more preferable, dye molecules incorporated into "packages" or vesicles enabling larger deposits of colour.

2.4 Fabric Regenerating Agents

The benefit agent can be an agent able to regenerate damaged fabric. For example, enzymes able to synthesize cellulose fibre could be used to build and repair damaged fibres on the garment.

2.5 Others

A host of other agents could be envisaged to impart a benefit to fabric. These will be apparent to those skilled in the art and will depend on the benefit being captured at the fabric surface. Examples of softening agents are clays, cationic surfactants or silicon compounds. Examples of finishing agents/protective agents are polymeric lubricants, soil repelling agents, soil release agents, photo-protective agents (sunscreens), anti-static agents, dye-fixing agents, anti-bacterial agents and anti-fungal agents.

3.1 The Fabrics

For laundry detergent applications, several classes of natural or man-made fabrics can be envisaged, in particular cotton. Such macromolecular compounds have the advantage that they can have a more immunogenic nature, i.e. that it is easier to raise antibodies against them. Furthermore, they are more accessible at the surface of the fabric than for instance coloured substances in stains, which generally have a low molecular weight.

An important embodiment of the invention is to use a binding molecule (as described above) that binds to several different types of fabrics. This would have the advantage of enabling a single benefit agent to be deposited to several different types of fabric. The invention will now be further illustrated by the following, non-limiting examples.

EXAMPLE 1

Enhanced Stain Removal from Cotton Fabric Using a Stain Highlighter 1.1 Preparation of a Multivalent Antigen Binding Protein A multivalent antigen binding protein (bihead) was prepared according to methods known in the art; see, for example, WO-A-99/23221. The specificity of the bihead was screened such that it recognised glucose oxidase (Novo Nordisk) and red wine by coating these antigens onto Nunc immunotubes at 37° C. for 1 week. The tubes were then washed with phosphate buffered saline containing 0.01% (w/v) sodium azide (PBSA) and then blocked by the addition of a PBSA solution containing bovine serum albumin (2% w/v), Marvel™ (1% w/v) and Tween 20 (0.1% v/v) for 3 hours. Panning of coated tubes were then performed using techniques known in the art.

1.2 Preparation of Highlighter Roll-on Sticks and Stained Cotton

Binding molecules were incorporated into roll-on products as follows:

The bihead was made up to 5 mg/ml in PBS and to this hydroxypropyl cellulose was added (0.8% w/v). The solution was mixed thoroughly using a Silverson L4RT homogeniser until the solution became clear (approximately 60 minutes). This solution was then placed in a plastic Sure™ roll-on applicator and the ball fitting secured. As a control a roll-on applicator was prepared containing PBS with hydroxypropyl cellulose.

Red wine (100 μl of Cote du Rhône, Co-op, UK.) was pipetted onto white cotton fabric and allowed to air dry. The stained fabric was then sealed in a foil bag and stored in the dark for at least 4 days until required.

1.3 Application of Bihead to Stained Cotton

The highlighting device was rolled across the cotton surface and in doing so applied the bihead onto the stained area. In parallel, a roll-on applicator only containing PBS and hydroxypropyl cellulose was also used on red wine stained fabric as a control.

1.4 Removal of Stain

Following treatment of the stained fabric each cloth was placed in a Petri dish. To the dish 20 ml of PBS containing 0.75% CoCo 6.5 EO/LAS detergent mix (at a ratio of 2:1 CoCo:LAS) and 1 mg/ml glucose oxidase (Novo Nordisk) at pH 8.1 was added. The Petri-dish was agitated on a rocker for 30 minutes at room temperature and then the solution was discarded. The cotton fabric was washed twice by the addition of PBS containing 0.75% CoCo/LAS detergent mix and then transferred into a clean Petri dish. A solution of glucose (10 mM in PBS containing 0.75% CoCo/LAS detergent mix) was then added and the Petri-dish was incubated for 50 minutes at 37° C. During this stage glucose is converted into hydrogen peroxide by any glucose oxidase captured by the bihead on the stained fabric. Some Red wine stained fabric was subjected to a wash in PBS containing 0.75% CoCo/LAS detergent mix without the addition of glucose oxidase or glucose (Wash). Following the 50 minute incubation the fabric was removed from the solution air dried and the change in colour monitored on a ColourEye instrument.

1.5 Analysis of Stain Removal

In the following Table 1, ΔE shows the change in light intensity at 370–650 nm measured against the stained fabric before any treatment. The ΔΔE shows the difference in stain intensity over the wash treated fabric only.

TABLE 1

| | ΔE | Mean ΔE | ΔΔE |
|---|---|---|---|
| Bihead/GOx | 12.25 | 12.23 | 1.30 |
| Bihead/GOx | 12.20 | | |
| Gox | 11.06 | 11.37 | 0.44 |
| Gox | 11.67 | | |
| Wash | 11.20 | 10.93 | 0.00 |
| Wash | 10.66 | | |

These results show that the application of bihead in a highlighter roll-on is able to reduce the amount of red wine stain on a cotton surface by 1.3 ΔE.

EXAMPLE 2

Highlighting Polyester Fabric with Antibody

This example demonstrates how non-specific binding can be used to locate an antibody onto a fabric surface.

2.1 Preparation of hCG-Alkaline Phosphatase Conjugate

Human chorionic gonadotrophin ("hCG") (Sigma Chemical Co.), 1 ml of a 2 mg/ml solution of phosphate buffered saline, PBS) and alkaline phosphatase (Boehringer Mannheim, 1 mg/ml of a 10 mg/ml solution in PBS) were stirred at room temperature (10 minutes) in a reacti™ vial to allow the reactants to mix. Fresh monomeric glutaraldehyde (Polysciences, 37.5 μl, 10% solution in distilled water) was added and stirred at room temperature for three hours. The reaction was then quenched and the product stabilised by adding 25 ml of 5% ovalbumin made up in 50 mM Tris buffer, pH 7.5 containing 0.1% sodium azide that had been filtered through a 0.22 μm filter. The conjugated hCG was stored at −20° C. until required.

2.2 Highlighting Fabric Surfaces with Antibody

Fourteen 2"×2" swatches of woven polyester were highlighted with a 5 μl droplet of antibody using a Gilson pipette. Seven of the swatches were highlighted with antibody specific for hCG (MAb 3299), serially diluted from 3100 μg/ml to 4 μg/ml in 10 mM sodium acetate buffer pH 5 containing 1 mg/ml bovine serum albumin (BSA) and 0.01% polyoxyethylene sorbitan monolaurate (Tween 20 from Sigma Chemical Co). The other seven swatches were highlighted in the way using antibody specific for oesterone-3-glucuronide (E3G) (MAb 4155). The swatches were incubated for 15 min at room temperature.

2.3 Identifying Highlighted Fabric

Antibody was revealed by incubating the swatches for 15 min with 700 μl hCG alkaline phosphatase conjugate diluted in the sodium acetate buffer detailed in section 1.2. Following 3 washes in 10 ml sodium acetate buffer, each swatch was incubated with 700 μl of alkaline phosphatase substrate solution (1 Sigma BCIP/NBT tablet in 10 ml 1 M diethanol amine containing 1 mM $MgCl_2$ at pH 8.5). After 3 min a purple residue appeared and the swatches were rinsed in water, dried at room temperature then scanned. It was observed that at 12 and 114 μg/ml antibody concentration the fabric could be specifically highlighted. However, as the concentration of antibody is increased to more than 1 mg/ml specificity is lost.

The present disclosure is to be considered as in all respects illustrative and not restrictive, the scope of the invention being indicated by the appended claims, and all changes which come within the meaning and range of equivalency (for example using an antibody which binds non-specifically to a fabric and is capable of binding to a benefit agent), are intended to be embraced therein.

What is claimed is:

1. A method of delivering a benefit agent to a selected area of a fabric for exerting a pre-determined activity, which comprises pre-treating said area with a multi-specific binding molecule, said binding molecule having a high binding affinity to said area through one specificity and is capable of binding to said benefit agent through another specificity, followed by contacting said pre-treated area with said benefit agent to exert said pre-determined activity to said area wherein said binding molecule is an antibody, an antibody fragment, or a derivative thereof.

2. The method of claim 1, wherein said binding molecule is a fusion protein comprising a cellulose binding domain and a domain having a high binding affinity to another ligand.

3. The method of claim 1, wherein said area of a fabric comprises one or more stains, said pre-determined activity is bleaching activity, and said benefit agent is capable of generating a bleaching agent.

4. The method of claim 1, wherein said benefit agent is an enzyme or enzyme part capable of catalyzing the formation of a bleaching agent.

5. The method of claim 1, wherein said benefit agent is an oxidase or haloperoxidase or functional part thereof.

6. A method of delivering a benefit agent to a selected area of a fabric for exerting a pre-determined activity, which comprises pre-treating said area with a multi-specific binding molecule, said binding molecule having a high binding affinity to said area through one specificity and is capable of binding to said benefit agent through another specificity, followed by contacting said pre-treated area with said benefit agent to exert said pre-determined activity to said area wherein said benefit agent is selected from the group consisting of glucose oxidase, galactose oxidase alcohol oxidase, and chloroperoxidase.

7. The method of claim 6, wherein said benefit agent is a vanadium chloroperoxidase.

8. The method of claim 6, wherein said benefit agent is a *Curvularia inaequalis* chloroperoxidase.

9. The method of claim 3, wherein said bleaching agent is selected from the group consisting of hydrogen peroxide and a hypohalite.

10. The method of claim 4, wherein said enzyme part is a laccase or a peroxidase and said bleaching agent is derived from an enhancer molecule that has reacted with the enzyme.

11. The method of claim 4, wherein said enzyme part is bound to said binding molecule having a high binding affinity for porphyrin derived structures, tannins, polyphenols, carotenoids, anthocyanins, and Maillard reaction products.

12. The method of claim 4, wherein said enzyme part is bound to said binding molecule having a high binding affinity for porphyrin derived structures, tannins, polyphenols, carotenoids, anthocyaflins, and Maillard reaction products when they are adsorbed onto the surface of a fabric.

13. The method of claim 1, wherein the fabric is cotton, polyester, polyester/cotton, or wool.

14. The method of claim 1, wherein said antibody or said antibody fragment or said derivative thereof is all of part of a heavy chain immunoglobulin that was raised in Camelidae and has a specificity for stain molecules.

15. The method of claim 1, wherein said antibody or said antibody fragment or said derivative thereof bind to chemical constituents which are present in tea, blackberry and red wine including non-pigmented components of stains.

16. A method of delivering a benefit agent to a selected area of a fabric for exerting a pre-determined activity, which comprises pre-treating said area with a multi-specific binding molecule, said binding molecule having a high binding affinity to said area through one specificity and is capable of binding to said benefit agent through another specificity, followed by contacting said pre-treated area with said benefit agent to exert said pre-determined activity to said area, wherein said binding molecule binds to chemical constituents which are present in tea, blackberry and red wine including non-pigmented components of stains.

17. The method of claim 1, wherein the binding molecule having a high binding affinity has a chemical equilibrium constant $K_d$ for the substance of less than $10^{-4}$ M.

18. The method of claim 1, wherein the binding molecule having a high binding affinity has a chemical equilibrium constant $K_d$ of less than $10^{-7}$ M.

19. The method of claim 1, wherein said benefit agent is selected from the group consisting of fragrance agents, perfumes, colour enhancers, fabric softening agents, polymeric lubricants, photoprotective agents, latexes, resins, dye fixative agents, encapsulated materials, antioxidants, insecticides, anti-microbial agents, soil repelling agents, soil release agents, and cellulose fiber repair agents.

20. The method of claim 1, wherein said benefit agent is comprised in an aqueous solution.

21. The method of claim 1, wherein said multi-specific binding molecule is applied to said area of a fabric by a roll-on pen, or is incorporated into a semi-solid wax or soap stick, spray, aerosol, impregnated brush, gel, or foam.

22. The method of claim 3, wherein said bleaching agent is a hypohalite.

23. The method of claim 1, wherein the binding molecule having a high binding affinity has a chemical equilibrium constant $K_d$ for the substance of less than $10^{-6}$ M.

24. The method of claim 1, wherein said antibody or said antibody fragment or said derivative thereof bind to chemical constituents which are present in tea, blackberry and red wine including pectins.

25. The method of claim 1, wherein said binding molecule binds to chemical constituents which are present in tea, blackberry and red wine including pectins.

* * * * *